United States Patent
Mauritz

(10) Patent No.: US 7,955,798 B2
(45) Date of Patent: Jun. 7, 2011

(54) REUSABLE SUBSTRATE FOR DNA MICROARRAY PRODUCTION

(75) Inventor: Ralf Mauritz, Penzberg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 1050 days.

(21) Appl. No.: 11/211,846

(22) Filed: Aug. 25, 2005

(65) Prior Publication Data

US 2006/0046262 A1   Mar. 2, 2006

(30) Foreign Application Priority Data

Aug. 25, 2004   (EP) .................................... 04020113

(51) Int. Cl.
*C12Q 1/68* (2006.01)
*C12M 1/34* (2006.01)
*C12M 3/00* (2006.01)
*C25D 5/02* (2006.01)

(52) U.S. Cl. .................... 435/6; 435/287.2; 205/122

(58) Field of Classification Search ........... 435/6, 287.2; 205/122
See application file for complete search history.

(56) References Cited

U.S. PATENT DOCUMENTS

| | | | |
|---|---|---|---|
| 5,837,859 A | 11/1998 | Teoule et al. | |
| 5,853,668 A | 12/1998 | Begg et al. | |
| 6,051,380 A | 4/2000 | Sosnowski et al. | |
| 6,093,302 A * | 7/2000 | Montgomery | 205/122 |
| 6,160,103 A | 12/2000 | Marchand et al. | |
| 6,160,104 A | 12/2000 | Cunningham et al. | |
| 6,187,914 B1 | 2/2001 | Teoule et al. | |
| 6,197,949 B1 | 3/2001 | Teoule et al. | |
| 6,780,584 B1 | 8/2004 | Edman et al. | |
| 2002/0058279 A1* | 5/2002 | Fritsch et al. | 435/6 |
| 2002/0061534 A1 | 5/2002 | Ogura | |
| 2003/0040870 A1 | 2/2003 | Anderson et al. | |
| 2003/0113832 A1* | 6/2003 | Lauf | 435/29 |
| 2003/0207295 A1* | 11/2003 | Gunderson et al. | 435/6 |

FOREIGN PATENT DOCUMENTS

| | | |
|---|---|---|
| EP | 0691978 B1 | 1/1996 |
| EP | 0902788 B1 | 3/1999 |
| EP | 0912593 B1 | 5/1999 |
| EP | 1265071 A2 | 12/2005 |
| WO | WO 93/22480 | 11/1993 |
| WO | 96/01836 A1 | 10/1996 |
| WO | WO 98/01221 | 1/1998 |
| WO | WO 99/03382 | 1/1999 |
| WO | WO 99/09044 | 2/1999 |
| WO | WO 99/67019 | 12/1999 |
| WO | 00/53311 A1 | 9/2000 |
| WO | WO 01/50131 A1 | 7/2001 |

OTHER PUBLICATIONS

Greene et al, Protective Groups in Organic Synthesis, 3rd ed., Wiley and Sons, New York, 1999, pp. 114 and 141.*
Hawley's Condensed Chemical Dictionary, pp. 884-885.*
Beaucage, S. L. et al., "Doxynucleoside Phosphoramidites—A New Class of Key Intermediates for Deoxypolynucleotide Synthesis," Tetrahedron Letters, vol. 22, No. 20, pp. 1859-1862, 1981.

(Continued)

*Primary Examiner* — Robert T. Crow

(57) ABSTRACT

The invention relates to a method for producing biopolymer arrays comprising a porous membrane and bound biopolymers. In particular, said production of biopolymer arrays comprises electrochemical production cycles.

22 Claims, 4 Drawing Sheets

OTHER PUBLICATIONS

Büchi, H. et al., "CV. Total Synthesis of the Structural Gene for an Alanine Transfer Ribonucleic Acid from Yeast. Chemical Synthesis of an lcosadeoxyribonucleotide Corresponding to the Nucleotide Sequecne 31 to 50," J. Mol. Biol. (1972) 72, 251-288.

Giegrich, H. et al., "New Photolabile Protecting Groups in Nucleoside and Nucleotide Chemistry—Synthesis, Cleavage Mechanisms and Applications, " Nucleosides & Nucleotides, 17(9-11), 1987-1996 (1998).

* cited by examiner

REUSABLE SUBSTRATE FOR DNA MICROARRAY PRODUCTION

SEQUENCE LISTING

The instant application contains a Sequence Listing which has been submitted in ASCII format via EFS-Web and is hereby incorporated by reference in its entirety. Said ASCII copy, created on Nov. 4, 2010, is named 22698US.txt and is 1,209 bytes in size.

FIELD OF INVENTION

The invention relates to a method for the production of biopolymer arrays comprising electrochemical steps and a porous membrane.

BACKGROUND

The synthesis of nucleic acids and peptides on a solid phase has become an established process during the last 20 years. The most prevalent method of nucleic acid synthesis is the phosphoramidite method of Beaucage, S. L. and Caruthers, M. H. (Tetrahedron Lett. 22 (1981) 1859-1862), where the oligonucleotide chain is built up by the repetitive condensation of individual nucleotide building blocks in the 3' or 5' direction. A variety of orthogonal protecting groups are used to protect three reactive nucleotide groups: the ribose sugar 5' hydroxyl group, the amino group of the nucleobase adenine, guanine and cytosine (thymine does not need a protecting group), as well as the phosphate group of the nucleotide 3' phosphate residue. The 4,4'-dimethoxytriphenylmethyl (DMT) group has become the standard protecting group for 5' hydroxyl, the 2-cyanoethyl protecting group the standard for the phosphate residue and various acyl groups the standard for the amino functions of the nucleobases according to Buchi, H. and Khorana, H. G. (J. Mol. Biol. 72 (1972), 251-288) and Souveaux (in: Methods in Molecular Biology, Vol. 26, Chap. 1 Protocol for Oligonucleoside Conjugates, S. Agrawal (ed.), Human Press Inc., Totowa, N.J. (1994)). These protecting groups are then cleaved under varying conditions, either during or after synthesis. The DMT group is cleaved off during synthesis in order to generate an hydroxyl group to which the next phosphoramidite can bind. The other named protecting groups remain until the end of the synthesis in order to prevent any side-reactions or by-products. At the end of the synthesis the complete oligonucleotide is deprotected by means of a base treatment, whereby the 2-cyanoethyl and the acyl protecting groups are cleaved.

There are essentially two ways of producing biochips, namely the off-chip and the on-chip synthesis of oligonucleotide probes. For off-chip synthesis, the oligonucleotide is produced on a commercially available synthesizer using the above-mentioned standard reagents and then immobilized on the chip. For on-chip synthesis, the oligonucleotide is produced directly on the chip using the above-mentioned standard reagents as well. In off-chip synthesis, the quality of the oligonucleotide can be analyzed by means of analytical processes such as HPLC or mass spectrometry and, where necessary, the quality can be improved via purification. In case of on-chip synthesis, only a limited quality control is applicable, whereas purification is not possible at all. Quality control for on-chip synthesis is in general only possible by means of the covalent binding of a (mainly fluorescent) label at the terminus of the oligonucleotide, which can then be detected and quantified.

The state of the art describes already the manufacturing of arrays with spatial addressable electrochemical on-chip synthesis. CIS BIO International describes a method to synthesize an array by using an electronically conductive copolymer and an electrochemical coupling procedure (EP 0 691 978). The arrays consists of a device with one or more electrodes, whereas the surface of the electrodes are coated with said conductive copolymer. Therefore, the conductive copolymer and the synthesized polymers are directly attached to the electrodes. After synthesis, the conductive copolymer together with the attached nucleotide polymers is used for hybridization reactions and the detection thereof.

Montgomery describes a synthesis method for the preparation of polymers using electrochemical placement of monomers at specific locations on a substrate containing at least one electrode (WO 98/01221). The substrate provides at its surface at least one electrode that is proximate to at least one molecule bearing at least one protected chemical functional group. Montgomery also describes the electrochemical solid phase synthesis for the preparation of diverse sequences of separate polymers or nucleic acids at a specific location on a substrate in the U.S. Pat. No. 6,093,302. The patent claims a method for the electrochemical placement of a material at a specific location on a substrate having at its surface at least one electrode that is proximate to at least one molecule, wherein said molecule is either directly attached to the surface of said substrate or it is attached to the surface of said substrate via a linker molecule or it is attached to a layer of material overlaying said substrate.

Another attempt to synthesize large numbers of polymers is disclosed by Southern (WO 93/22480). Southern describes a method for synthesizing polymers at selected sites by electrochemically modifying a surface, whereas this method comprises an electrolyte overlaying the surface and an array of electrodes adjacent to said surface. In each step of the synthesis process, an array of electrodes is mechanically placed adjacent to the surface in order to modify the surface. The array of electrodes is then mechanically removed and the surface is subsequently contacted with selected monomers. For subsequent reactions, the array of electrodes is again mechanically placed adjacent to the surface. This method requires a large amount of control to position the electrodes repeatedly on the surface, providing the necessary accuracy.

SUMMARY OF THE INVENTION

In view of the prior art, the invention is directed to a method for the electrochemical synthesis of biopolymer arrays on a support, whereby the electrical devices and the biopolymer array are separated after the production.

One subject matter of the present invention is a method for the electrochemical production of a biopolymer array comprising a porous membrane and bound biopolymers composed of monomeric, oligomeric or polymeric biopolymer building blocks, comprising the following steps:
a) providing an electrode array comprising selectively addressable electrodes,
b) providing a porous membrane comprising binding sites for biopolymer building blocks bearing protective groups that are electrochemically unstable,
c) providing liquid reagents comprising monomeric, oligomeric or polymeric biopolymer building blocks, said biopolymer building blocks optionally comprise binding sites for biopolymer building blocks bearing protective groups that are electrochemically unstable,
d) bringing said porous membrane and said electrode array into physical contact, e) performing at least one production cycle comprising
   applying an electrical potential to at least one selected electrode of said electrode array, whereby an electrochemical reaction deprotects the protective groups of those binding sites that are arranged above said selected electrodes and that comprise electrochemically unstable protective groups being electrochemically unstable at said applied electrical potential and
   bringing said porous membrane and said electrode array into physical contact with said liquid reagents, whereby said monomeric, oligomeric or polymeric biopolymer building blocks of said liquid reagents bind to the electrochemically deprotected binding sites, and
f) removing the produced biopolymer array comprising said porous membrane and bound biopolymers composed of monomeric, oligomeric or polymeric biopolymer building blocks from said electrode array.

In alternative embodiments of the invention, the steps a) to c) are performed in any other possible succession of these steps.

Generally, the invention relates to the use of porous membranes for manufacturing of biopolymer arrays. The term "biopolymer" as used in the present invention particularly relates to nucleic acids, such as DNA, RNA or nucleic acid analogues like peptide nucleic acids (PNA) or locked nucleic acids (LNA) or combinations thereof. However, the term "biopolymer" also relates to peptides and peptide analogues as well as to other biopolymer species such as carbohydrates or any combinations thereof. The term "biopolymer array" is used in the present invention to point out that a plurality of different biopolymer species are bound to a solid support in a spacial distributed fashion.

The support of the biopolymer array throughout this invention is a porous membrane, whereas the material of said porous membrane is selected from inorganic materials such as glass, glass fibre, plastics, metal oxides and silicon derivatives or organic materials such as cellulose. In general all porous materials are possible within the scope of this invention as far as the surface of this porous material comprises binding sites for said biopolymers or as far as the surface of this porous material may be functionalized with binding sites for said biopolymers.

The method of the present invention provides a plurality of different biopolymer species bound to the porous membrane, whereas said biopolymers are composed of monomeric, oligomeric or polymeric biopolymer building blocks. These biopolymer building blocks are e.g. nucleotides, oligonucleotides or polynucleotides in case of nucleic acid molecules and peptides, oligopeptides or polypeptides in case of amino acids. The polymeric building blocks are provided in terms of liquid reagents comprising optionally additional components necessary for the synthesis of biopolymer species. Preferably, said polymeric building blocks are provided in aqueous buffer solutions or in organic solvents.

There are two major procedures to produce a biopolymer array on a solid support in a multitude of production cycles. In the first procedure, the complete biopolymer is synthesized off-chip and is coupled afterwards to the desired spot on the porous membrane in one single step. This is called a coupling cycle throughout this invention. In order to realize an array of spacial distributed spots with different biopolymer species, for every biopolymer species a separate coupling cycle has to be performed. The second procedure is the on-chip synthesis, where each biopolymer molecule is synthesized on the porous membrane in more than one step from monomeric, oligomeric or polymeric biopolymer building blocks. Every step of this procedure is called a synthesis cycle throughout this invention.

The synthesis or the coupling of biopolymer species on the porous membrane is carried out by electrochemical procedures throughout this invention and is called the electrochemical production of the biopolymer array. To realize an electrochemical production of the biopolymer array, the porous membrane as well as the polymeric building blocks in case of one or more synthesis cycles have to have binding sites that are protected by protective groups, whereas these protective groups are electrochemically unstable. For the electrochemical production of a biopolymer array every synthesis or coupling cycle involves at least one situation, where an electrical potential is applied to the porous membrane, electrochemically deprotecting those protective groups of bindings sites that are electrochemically unstable at the applied potential and that are located at certain parts of the porous membrane and/or at certain polymeric building blocks already attached to the porous membrane. The deprotection of protective groups can take place by cleaving the entire protective group, cleaving part of the protective group or by a conformational change within the protective group. The electrochemical deprotection of electrochemically unstable protective groups includes the direct deprotection by the applied potential as well as the deprotection by mediators produced at the surface of certain electrodes of the electrode array due to the applied potential. After the deprotection of certain protective groups, monomeric, oligomeric or polymeric biopolymer building blocks can bind to said deprotected binding sites.

The electrode array comprises a solid support and an arrangement of more than one individual electrodes. Any material can be used for these individual electrodes as far as it has an appropriate electrical conductivity and as far as it is electrochemically stable across a certain potential range, namely metallic materials or semiconductor materials. For the solid support of the individual electrodes any material can be used as far as it has properties that avoid a short circuit between individual electrodes.

The arrangement of individual electrodes is designed so that every electrode is a selectively addressable electrode. Therefore, the design of the arrangement of individual electrodes provides the option to address a certain number of electrodes simultaneously in groups or every electrode on its own by an electrical potential.

Every electrode of said electrode array defines a certain area on the porous membrane, where electrochemical reaction can take place due to an applied potential at said electrode. Therefore, every electrode corresponds to an individual spot on the porous membrane, whereas each individual spot comprises certain biopolymer species after the electrochemical production of the biopolymer array that are defined by the production procedure.

For the production cycles the electrode array, the porous membrane and the liquid reagents are in physical contact. The electrode array and the porous membrane are reversibly combined with each other in close proximity and in a defined lateral alignment. The interlayer between the electrode array and the porous membrane has to be optimized to guarantee that the applied potential or the mediators reach the protective groups to fulfill the deprotection. The combination of electrode array and porous membrane is immersed in the liquid reagents, like e.g. in a flow chamber, when a coupling or synthesis cycle is performed.

Another aspect of the invention is a biopolymer array comprising a porous membrane and bound biopolymers composed of monomeric, oligomeric or polymeric biopolymer building blocks produced by a method according to the invention.

The biopolymer array according to the invention is produced in a multitude of production cycles, whereas either the pre-synthesized biopolymer species are coupled to the desired spots on the porous membrane in a multitude of electrochemical coupling cycles or each of the biopolymer species are synthesized on the desired spots of the porous membrane in a multitude of electrochemical synthesis cycles from monomeric, oligomeric or polymeric biopolymer building blocks. Alternatively, combinations of coupling cycles and synthesis cycles are used for the electrochemical production of the biopolymer arrays.

Yet another aspect of the invention concerns the use of the biopolymer array according to the invention for the analysis of samples containing biological molecules.

Throughout this invention biological molecules are e.g. nucleic acid molecules or polypeptides. If the biopolymer array comprises e.g. a multitude of different polynucleotide probes, said biopolymer array can be used to verify the presence of the corresponding complementary polynucleotide targets in the solution by detecting the specific hybridization reactions between probes and targets. Possible techniques to detect such hybridization reactions are known to someone skilled in the art, e.g. fluorescence techniques, chemiluminescence techniques, electrochemical techniques or mass spectrometric techniques. Additionally, the produced biopolymers can be cleaved after the electrochemical production of the biopolymer array and therefore, the production of the biopolymer array is a method to synthesize a small amount of biopolymers in a controlled way.

The invention also concerns a kit comprising an electrode array, a porous membrane, a device for applying electrical potentials and reagents to perform a method according to the invention.

The kit according to the invention comprises all components necessary to perform an electrochemical production of a biopolymer array on a porous membrane. Besides the porous membrane itself, the electrode array with a multitude of selectively addressable electrodes, the liquid reagents containing the monomeric, oligomeric or polymeric biopolymer building blocks and a device to apply the electrical potential to a selected electrode or to a selected group of electrodes are essential to perform the method according to the invention. Such a device to apply the electrical potential is e.g. a standard potentiometer as known to someone skilled in the art.

DETAILED DESCRIPTION OF THE INVENTION

Figure 1A:
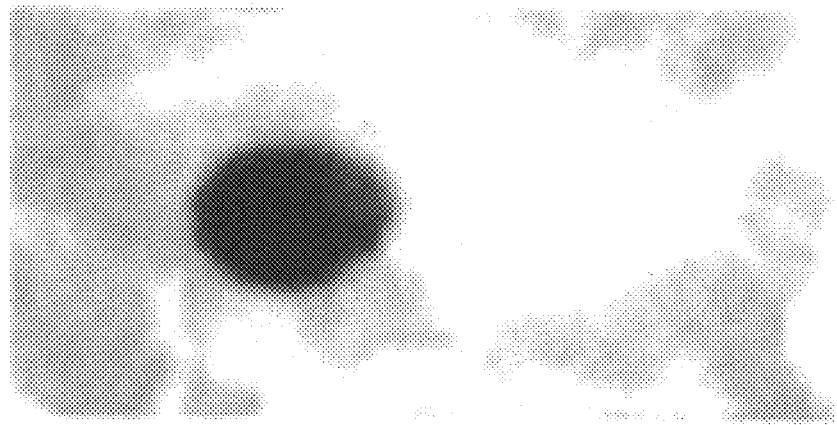
FIG. 1: Fluorescence images of a porous membrane with 2 spots having different attached fluorescence dyes recorded at 600 nm (FIG. 1a) and at 520 nm (FIG. 1b).

One subject matter of the present invention is a method for the electrochemical production of a biopolymer array comprising a porous membrane and bound biopolymers composed of monomeric, oligomeric or polymeric biopolymer building blocks, comprising the following steps:

a) providing an electrode array comprising selectively addressable electrodes, b) providing a porous membrane comprising binding sites for biopolymer building blocks bearing protective groups that are electrochemically unstable, c) providing liquid reagents comprising monomeric, oligomeric or polymeric biopolymer building blocks, said biopolymer building blocks optionally comprise binding sites for biopolymer building blocks bearing protective groups that are electrochemically unstable, d) bringing said porous membrane and said electrode array into physical contact, e) performing at least one production cycle comprising
   applying an electrical potential to at least one selected electrode of said electrode array, whereby an electrochemical reaction deprotects the protective groups of those binding sites that are arranged above said selected electrodes and that comprise electrochemically unstable protective groups being electrochemically unstable at said applied electrical potential and
   bringing said porous membrane and said electrode array into physical contact with said liquid reagents, whereby said monomeric, oligomeric or polymeric biopolymer building blocks of said liquid reagents bind to the electrochemically deprotected binding sites, and f) removing the produced biopolymer array comprising said porous membrane and bound biopolymers composed of monomeric, oligomeric or polymeric biopolymer building blocks from said electrode array.

With a multitude of electrochemical production cycles the biopolymer array is produced on the porous membrane. With respect to nucleic acids or amino acids as biopolymers, the possible procedures to perform an off-chip as well as an on-chip synthesis are known to someone skilled in the art. For example, nucleic acids may be synthesized from phosphoramidite or phosphonate building blocks as known in the art (Beaucage, S. L. and Caruthers, M. H., Tetrahedron Lett. 22 (1981) 1859-1862).

In a preferred method according to the invention in step e) said monomeric, oligomeric or polymeric biopolymer building blocks of said liquid reagents bind to the electrochemically deprotected binding sites of said porous membrane in all production cycles.

In this preferred method, off-chip synthesized biopolymers of any length ranging from short oligomeric building blocks to long polymeric building blocks are coupled to the porous membrane. Therefore, at each binding site of the porous membrane only one coupling cycle is performed comprising the deprotection of said binding site of the porous membrane and the successive coupling of the desired biopolymer building block. To produce an array of spots, each with a different biopolymer content, a separate coupling cycle has to be performed for each different biopolymer, whereas in each coupling cycle other binding sites have to be deprotected, preferably located above different selected electrodes. Because in this preferred method of the invention only one oligomeric or polymeric biopolymer building block is coupled to each binding site of the porous membrane, it is not necessary to provide said biopolymer building blocks with protective groups that are electrochemically unstable for this embodiment.

Nervertheless, it may be necessary to protect the binding sites of the biopolymer building blocks even in this embodiment in order to prevent the side-reactions of biopolymer building blocks, but here the protective goups need not to be electrochemically unstable.

In another preferred method according to the invention in step e) said monomeric, oligomeric or polymeric biopolymer building blocks of said liquid reagents bind to the electrochemically deprotected binding sites of said porous membrane and/or to the electrochemically deprotected binding sites of said monomeric, oligomeric or polymeric biopolymer building blocks bound to the porous membrane.

In case of on-chip synthesis, the synthesis is a spatial directed synthesis, whereas different biopolymer species are synthesized on different locations off the support. In general, these methods involve the deprotection of protected binding sites on the support, usually by cleaving said protective groups of said binding sites and coupling to said deprotected binding sites a monomeric, oligomeric or polymeric building block which, itself has a protected binding site in order to provide the option of coupling additional biopolymer building blocks. Methods for spatial directed biopolymer synthesis based on spatial deprotection of protective groups include light-directed synthesis, electrochemical synthesis and microlithography. Other possibilities to perform a spatial directed synthesis without protecting groups comprise the placement of liquid reagents containing polymeric building blocks on selected parts of the support by inkjet pin printing, microchannel deposition and confinement with physical barrierdkrdkrs.

In this embodiment, every coupling of a certain monomeric, oligomeric or polymeric building block to the deprotected binding sites of the porous membrane and/or of the biopolymer building blocks is called a synthesis cycle throughout the invention. Note, that in one synthesis cycle, said monomeric, oligomeric or polymeric building blocks of a certain kind can be coupled in parallel to deprotected binding sites of the porous membrane and to deprotected binding sites of polymeric building blocks that are already coupled to the porous membrane, whereas the deprotected binding sites may be located above more than one electrode. After the coupling of a first monomeric, oligomeric or polymeric building block to all binding sites of the porous membrane, in all further synthesis cycles the polymeric building blocks only couple to deprotected binding sites of the polymeric building blocks that are already coupled to the porous membrane.

After a certain number of production cycles the electrochemically produced biopolymer array is removed from the electrode array. The production of a biopolymer array can comprise only coupling cycles or only synthesis cycles or both types of cycles. For example, certain biopolymers are synthesized off-chip and coupled to certain spots of the array, whereas other biopolymers at other spots of the array are synthesized on-chip with a certain number of synthesis cycles.

Since the method according to the invention provides the possibility to remove the produced biopolymer array away from the electrode array, the generally expensive electrode arrays can be used severalfold. In a preferred embodiment of the invention, the electrode array is used for the production of more than 2 biopolymer arrays, more preferred of more than 20 biopolymer arrays and most preferred of more than 100 biopolymer arrays.

In another preferred method according to the invention said porous membrane and said electrode array are in physical contact with a liquid solution, when the electrical potential is applied in the production cycles of step e).

The electrode array and the porous membrane being in physical contact are immersed in a liquid solution during the deprotection of protected binding sites. In one embodiment of the invention this liquid solution is an aqueous solution with a certain salt concentration and optionally additional components. In another embodiment of the invention the liquid solution comprises organic solvents and optionally additional components, such as redox couples. In both cases the liquid solution represents the connection between the electrodes of the electrode array and the protective groups of the binding sites of the porous membrane and/or of the polymeric building blocks. Applying a certain potential to selected electrodes of the electrode array, the components of said liquid solution will react on the applied potential in a controlled way and only the desired binding sites arranged above said selected electrodes are deprotected.

In yet another preferred method according to the invention, different protective groups that are electrochemically unstable at different electrical potentials are used to protect said binding sites. In this preferred method according to the present invention different protective groups are used for the production of biopolymer arrays, whereas said different protective groups are electrochemically unstable at different potentials. Using more than one kind of protective group e.g. for the protection of the binding sites of the porous membrane provides the opportunity to produce a mixture of more than one type of biopolymers at one individual spot of the porous membrane. Here, applying a first potential to a certain electrode deprotects only the fraction of binding sites of the porous membrane that feature protective groups electrochemically unstable at said potential and that are arranged above said electrode. After coupling of a first polymer species, the next fraction of binding sites is deprotected by applying a second potential, said second potential electrochemically deprotects a second type of protective groups.

Additionally, the procedure outlined above using more than one kind of protective group can be used for the production of a biopolymer array including synthesis cycles, too.

According to a preferred method of the invention, in two successive production cycles of step e) a different group of electrodes is selected and/or a different electrical potential is applied and/or different liquid reagents are provided.

Between two successive production cycles one or more or all of the production parameters have to be changed, because the same production cycle can not be performed twice. The production parameters that can be changed between two successive production cycles are the selected electrodes, the applied potential and the liquid reagents. Any changes of these parameters between two successive production cycles are feasible, e.g. the same potential is applied to different electrodes, whereas different liquid reagents are provided or the same potential is applied to different electrodes, whereas the same liquid reagents are provided or an other potential is applied to the same electrodes, whereas different liquid reagents are provided. The progression of the production cycles, whereas each production cycle has a certain combination of production parameters can be optimized e.g. regarding the number of necessary production cycles or the number of times the reagents have to be exchanged. Because of the large number of different combinations concerning the production parameters of the production cycles, more than one possibility may exist to produce a certain biopolymer array.

Another preferred method according to the invention comprises additional steps of rinsing said porous membrane in between two successive production cycles, whereby the liquid reagents containing unbound monomeric, oligomeric or polymeric biopolymer building blocks are removed from said porous membrane.

The liquid reagents contain much more monomeric, oligomeric or polymeric biopolymer building blocks than deprotected binding sites exist on the porous membrane. Therefore, the liquid reagent contains biopolymer building blocks even after the production cycles. Since it is difficult to remove the liquid reagent from the porous membrane completely, it is preferred to rinse the porous membrane with solutions that are free of biopolymer building blocks after the production cycle. The rinsing step is performed with the porous membrane in physical contact with the electrode array, because otherwise the porous membrane would have to be re-arranged on the electrode array after rinsing step. Only after the final production cycle, the porous membrane can be removed alternatively from the electrode array for rinsing.

In a preferred method of the invention said porous membrane is removed from said electrode array only once after the electrochemical production of the biopolymer array.

According to a preferred method of the invention said protective groups are deprotected by electrochemical reagents generated at the electrode surface by the applied electrical potential.

The protective groups can be unstable, if they are exposed to a certain electrical potential and the deprotection occurs directly due to said applied potential. Alternatively, the protective groups can be unstable in contact with certain electrochemical reagents and the deprotection occurs, when the protective groups are exposed to said electrochemical reagents. If e.g. the protective groups are unstable in acidic or basic conditions, it is possible to change the environment of the binding sites by $H^+$ or $OH^-$ ions that are produced at the electrode surface by applying an electrical potential.

According to another preferred method of the invention said protective groups are cleaved by applying said electrical potential.

The deprotection of the protective groups can take place in different ways. In one preferred alternative, the coupling of the protective group to the binding site is unstable and the deprotection occurs by cleaving the entire protective group. In another preferred alternative, the protective group itself is unstable and the deprotection occurs by cleaving a part of the protective group or by a conformational change within the protective group.

Yet another preferred method according to the invention comprises additional steps of detecting a detectable label coupled to the protective groups of the biopolymer building blocks that are bound to the porous membrane.

The protective groups protecting the binding sites of the porous membrane and/or of the polymeric building blocks can be functionalized with a detectable label. Such a label comprise for example fluorescence labels, electrochemical labels or radioactive labels. Alternatively, the protective group itself can be detectable and the functionalization with a detectable group is not necessary. The detection of said detectable groups can be used for the purpose of quality control, if the signal of said label is different for the protected and the deprotected state of the binding site.

In case of a deprotection comprising a cleavage of the entire protective group, the label can only be detected in the protected state of the binding sites. Therefore, the efficiency of the deprotection step can be analyzed by detecting the detectable label, whereas no signal corresponds to 100% deprotection. Additionally, the quality of the coupling of biopolymer building blocks to the deprotected binding sites can be analyzed, if said building blocks feature a labeled protective group, too. Here, the detectable labels are detected after the coupling of biopolymer building blocks, whereas a large signal corresponds to a high coupling efficiency. In order to perform the quality controls in a more quantitative way, the detectable labels are detected before and after each step.

According to a preferred method of the invention said electrical potential is applied to said electrodes of said electrode array in groups or individually.

The electrode array according to the invention comprises more than one individual electrodes. The design of said electrode array provides the opportunity to select any group of said electrodes or every electrode individually. This design offers a maximum of flexibility towards the optimization of the production procedure regarding number of production cycles or the number of times the reagents have to be exchanged, because a certain biopolymer building block can be coupled to any group of electrodes in parallel.

According to another preferred method of the invention said electrode array comprises electrodes that are metallic electrodes or semiconductor electrodes.

In the scope of this invention all materials are possible for the individual electrodes of the electrode array as far as they have an appropriate electrical conductivity and as far as they are electrochemically stable across a certain potential range. Preferably, the material for the individual electrodes is a metallic material or a semiconductor material. As a solid support of the individual electrodes any material can be used as far as it has properties that avoid a short circuit between individual electrodes. The solid support is preferably made out of glass, plastic, metal oxides or other silicon derivatives like silica.

In a preferred method according to the invention said porous membrane comprises a porous inorganic material, preferably a porous glass material, a porous plastic material, a porous silicon material or other porous polymer or porous copolymer materials.

Preferably the porous membrane is made out of glass, like e.g. glass fibres or it is made out of a polymer plastic, like polyethylene (PE), polypropylene (PP), polyethylenterephthalat (PET), polyacrylnitril (PAT), polyvinylidendifluorid (PVDF) or polystyrene.

Concerning the material of the porous membrane it is important that it has binding sites for the monomeric, oligomeric or polymeric biopolymer building blocks or that it can be functionalized with said binding sites. Preferred binding sites of the porous membrane for biopolymer building blocks are groups like hydroxyl (OH) groups, amino ($NH_2$) groups or other reactive groups known to someone skilled in the art.

Moreover, the material of the porous membrane has to have an optimized pore size. First of all, the size of the pores of the porous material must have a minimum value in order to be applicable for the present invention, because otherwise the biopolymer building blocks are not able to reach the binding sites of the porous membrane by diffusion. On the other hand, the pore size is preferably smaller than a maximum value, because otherwise the density of biopolymers on the porous membrane will decrease due to the reduced surface area of the porous membrane. If the density of biopolymers on the porous membrane is to small, potential hybridization reactions in a successive experiment are no longer detectable. In case of a biopolymer synthesis on the surface of a non-porous, planar support, it is in general difficult to obtain a density of biopolymers that is sufficient to perform certain detection techniques. The pore size of the porous membrane is preferably between 1 and 300 µm, more preferably between 1 and 100 µm, most preferably between 1 and 50 µm.

Regarding the thickness of the membrane an optimal value exist within the scope of this invention. A porous membrane which is very thin will provide only a small density of biopolymers on the biopolymer array and potential hybridization reactions in a successive experiment may not be detectable. On the other hand, if the membrane becomes to thick, the electrochemical production is no longer possible, because the communication between the electrodes of the electrode array and the protective groups of binding sites at the far end of the porous membrane is hindered. The thickness of the porous membrane is preferably between 1 and 1000 µm, more preferably between 1 and 500 µm, most preferably between 1 and 200 µm.

In general, the material of the porous membrane itself must be stable against the treatments necessary for the production cycles.

In another preferred method according to the invention said porous membrane comprises a porous organic material, preferably cellulose or nitrocellulose.

Also preferred is a porous membrane made out of porous organic material. Porous organic material preferred for the present invention are cellulose or nitrocellulose materials. Regarding the requirements of this kind of porous membranes the same statements are valid as outlined for the porous membranes made out of inorganic material.

In another preferred method of the invention said porous membrane is dividable into subunits after the electrochemical production of the biopolymer array, whereas said subunits comprise more than one individual spot with coupled biopolymers and whereas at least two of said subunits are identical.

This preferred method according to the invention is e.g. applicable, if large amounts of identical biopolymer arrays are needed. A multitude of production cycles are performed, whereas the production cycles for several electrodes are the same. The electrodes that are treated with the same production cycles are arranged in a uniform manner, so that the resulting biopolymer array comprises subunits with an identical arrangement of individual spots. Since these subunits are arranged in a uniform manner, too, the biopolymer array can be divided into pieces, particular by cutting, providing a multitude of individual, smaller biopolymer arrays.

Alternatively, two or more different subunits can be produced with this preferred method according to the invention, whereas each subunit comprises a different arrangement of individual spots.

According to a preferred method of the invention said porous membrane is fixed in a defined lateral position on top of said electrode array.

In a preferred embodiment of the invention, the porous membrane has no lateral structure, but is homogeneous across its whole circumference. Therefore, the spatial distributed individual spots, where biopolymer building blocks couple to the porous membrane to form the biopolymer array are only defined by the electrode array used for the electrochemical production and by the relative position of electrode array and porous membrane. Consequently, it is of importance to assure a fixed position of the porous membrane with respect to the electrode array throughout the complete electrochemical production of the biopolymer array.

According to another preferred method of the invention said porous membrane fixed on top of said electrode array is placed in a flow chamber.

For the electrochemical production steps according to the present invention the solutions or the liquid reagents surrounding the porous membrane have to be exchanged several times. This can be performed in an efficient manner using a flow chamber. A flow chamber in the scope of this invention is a closed chamber with a liquid inlet and a liquid outlet that containes the electrode array as well as the porous membrane in such a way that the lateral position of electrode array and porous membrane is fixed.

In a preferred method according to the invention said biopolymer building blocks are nucleic acid building blocks.

In a more preferred method according to the invention said nucleic acid building blocks are DNA, RNA or PNA building blocks.

Using nucleic acid building blocks or more preferred DNA, RNA or PNA building blocks as biopolymer building blocks the biopolymer array is a nucleic acid array or more preferred a DNA, RNA or PNA array.

In a preferred method according to the invention using nucleic acid building blocks the protective groups of said nucleic acid building blocks are acid labile protective groups, preferably pixyl groups or trityl groups, most preferably 4,4'-dimethoxy triphenylmethyl (DMT) or 4-monomethoxy triphenylmethyl (MMT), or base labile protective groups, preferably levulinyl groups or silyl groups, most preferably tert-butyldimethyl silyl (TBDMS) or tert-butyldiphenyl silyl (TBDPS).

A protective group is a chemical group that is attached to a functional group (for example to the oxygen in a hydroxyl group, the nitrogen in an amino group or the sulfur in a thiol group, thereby replacing the hydrogen) to protect the functional group from reacting in an undesired way. A protective group is further defined by the fact that it can be removed without destroying the biological activity of the molecule itself, e.g. the binding of the nucleic acid building block to a nucleic acid. Suitable protecting groups are known to a man skilled in the art. Preferred protecting groups according to this invention are dimethoxy trityl-(DMT), monomethoxy trityl-(MMT), trifluoroacetyl-, levulinyl, or silyl-groups.

Preferred protecting groups for hydroxyl groups at the 5'-end of a nucleotide or oligonucleotide are e.g. selected from the trityl groups, for example dimethoxy trityl (DMT).

Preferred protecting groups at exocyclic amino groups are acyl groups, most preferred the benzoyl group (Bz), phenoxyacetyl or acetyl or formyl, and the amidine protecting groups as e.g. the N,N-dialkylformamidine group, preferentially the dimethyl-, diisobutyl-, and the di-n-butylformamidine group.

Preferred O-protecting groups are the aroyl groups, the diphenylcarbamoyl group, the acyl groups, and the silyl groups. Among these most preferred is the benzoyl group. Preferred silyl groups are the trialkylsilyl groups, like, trimethylsilyl, triethylsilyl and tert-butyldimethylsilyl.

Another preferred silyl group is the trimethylsilyl-oxymethyl group (TOM) (WO 99/09044). Further, preferred protecting groups are ortho nitro-benzyl, 2-(4-nitrophenyl) ethoxycarbonyl (NPEOC), photoactivable compounds as 2-nitrophenyl-propyloxy-carbonyl (NPPOC) (Giegrich, H. et al., Nucleosides & Nucleotides 17 (1998) 1987-1996) and allyloxycarbonyl.

In another preferred method according to the invention said biopolymer building blocks are amino acid building blocks.

With said amino acid building blocks it is possible to synthesize polypeptides on the porous membrane. Preferably said polypeptides have a length of up to 20 amino acids, more preferably of up to 50 amino acids. These polypeptides can e.g. represent the functional fraction of a protein and therefore, the biopolymer array is a polypeptide array comprising a certain amount of different functional protein fractions for screening applications.

In a preferred method according to the invention using peptide building blocks said protective groups of said peptide building blocks are base labile protective groups, preferably fluorenylmethoxycarbonyl (FMOC) or acid labile protective groups, preferably tert-butyloxycarbonyl (BOC).

In yet another preferred method according to the invention, the coupling of the biopolymers to the porous membrane is unstable under certain conditions.

In this preferred method according to the invention, the biopolymers coupled to the porous membrane may be released after the electrochemical production of the biopolymer array. Therefore, in this embodiment of the invention the production of the biopolymer array is a method to synthesize a small amount of biopolymers in a controlled way. Additionally, the production of the biopolymer array is a method to synthesize small amounts of a plurality of different biopolymers in parallel.

For this embodiment of the invention the coupling of the biopolymers to the porous membrane is unstable under certain conditions. Since the controlled cleavage of the biopolymers is needed not until the final production cycle, said coupling of the biopolymers to the porous membrane must be stable to the conditions applied during the production cycles. The cleavage of the biopolymers from the porous membrane can be performed using electrical potential, irradiation or chemical treatment. Possible cleavable linkers for biopolymers are base-labile moieties like a succinyl-, oxalyl- or a hydrochinone linker (Q-linker), or photo-labile moieties like 2-nitrobenzyl-succinyl- or veratrol-carbonat-linker, or linkers cleavable under reductive conditions like the thio-succinyl-linker, or acid labile moieties like derivatives of trityl groups, for example derivatives of 4,4'-dimethoxy trityl groups.

The linker group between the porous membrane and the biopolymers is preferably cleaved by applying a potential that is different from the potential used to remove the protective groups. This enables removal of the various synthesized polymers, e.g. nucleic acid sequences following completion of the synthesis by way of electrochemical reactions.

Another aspect of the invention concerns a biopolymer array comprising a porous membrane and bound biopolymers composed of monomeric, oligomeric or polymeric biopolymer building blocks produced by a method according to the invention.

In the scope of this invention, said biopolymer arrays can be produced either by coupling of pre-synthesized biopolymers to the porous membrane in one or more coupling cycles or by synthesizing the biopolymers from monomeric, oligomeric or polymeric biopolymer building blocks on the porous membrane in more than one synthesis cycle. In an alternative embodiment of the invention, the biopolymer arrays are produced using one or more coupling cycles and one or more synthesis cycles.

The biopolymer arrays according to the invention comprise the porous membrane and one or more species of biopolymers coupled to said porous membrane. In one embodiment of the invention each biopolymer species is arranged in an individual spot, said individual spots being spatial separated on the porous membrane. Alternatively, an individual spot can comprise more than one biopolymer species, too.

In a preferred embodiment of the biopolymer array according to the invention, said biopolymer array comprise more than 10, more preferred more than 100 and most preferred more than 1000 individual spots.

In another preferred embodiment of the biopolymer array according to the invention, said individual spots are arranged on the porous membrane in an uniform manner with a distance between the spots of below $10^3$ μm, more preferred below 500 μm or most preferred below 50 μm.

In a preferred biopolymer array according to the invention said biopolymer building blocks are nucleic acid building blocks, preferably DNA, RNA or PNA building blocks.

In another preferred biopolymer array according to the invention said biopolymer building blocks are peptide building blocks, preferably amino acid building blocks.

The biopolymer arrays according to the invention are preferably nucleic acid arrays or more preferred DNA, RNA or PNA arrays. Alternatively, the biopolymer arrays according to the invention are preferably polypeptide arrays.

Yet another aspect of the invention concerns the use of the biopolymer array according to the invention for the analysis of samples containing biological molecules.

The biopolymer arrays comprising a multitude of different biopolymer species are suitable for screening application, where a sample is analyzed with respect to the presence of the corresponding binding partner of said biopolymer species.

In a preferred use of the biopolymer array according to the invention said biological molecules are nucleic acid molecules or proteins.

In case of nucleic acids as biopolymers, the produced nucleic acid arrays can be used for the detection of target nucleic acids in a sample or for nucleic acid sequencing. Applications for the nucleic acid arrays comprise the analysis of viral or bacteriological infections, the detection of single nucleotide polymorphism (SNP), the sequencing of unknown nucleic acid molecules or gene expression profiling.

In case of polypeptides as biopolymers, the produced polypeptide arrays can be used e.g. for the screening of antibodies. The polypeptides represent the functional part of proteins and the affinity of a multitude of said functional parts to a certain antibody can be screened.

In another preferred use of the biopolymer array according to the invention said analysis of samples is an analysis based on fluorescence techniques, chemiluminescence techniques, electrochemical techniques or mass spectrometric techniques.

The potential binding of target molecules in a sample to the probe biopolymers on the porous membrane can be detected using a multitude of different techniques known to someone skilled in the art. A widespread technique to visualize binding reaction on a support is the use of fluorescence spectroscopy. Here, e.g. the target molecules are labeled with a fluorescence dye, such as Fluorescein, TEXAS RED (Molecular Probes), CY5 and CY3 (GE Healthcare), and the existence of said dye at a certain individual spot of the porous membrane is an indication for the presence of the corresponding target molecule in the sample. The fluorescence of the porous membrane is visualized e.g. by a CCD-camera. It is preferred that the porous membrane of the biopolymer array is placed on a solid support for analysis purposes. For example, the biopolymer array is fixed on a glass support, such as a standard cover slide, before the assembly is placed in a detection apparatus comprising e.g. a CCD-camera. Alternatively, the biopolymer array is fixed by a holding frame, providing the biopolymer array accessible with solutions from both sides.

With mass spectrometric (MS) techniques, the potential complexes out of probe biopolymer and target molecule are analysed by a commercial MS-apparatus as known to someone skilled in the art.

In case of electrochemical techniques, e.g. the target molecules are labeled with an electrochemical label, such as ferrocen derivatives or osmium complexes, and the existence of said dye at a certain individual spot of the porous membrane is an indication for the presence of the corresponding target molecule in the sample.

The electrochemical signals from the porous membrane are detected e.g. by an electrode array in combination with a potentiometer.

According to a more preferred use of the biopolymer array according to the invention said electrochemical techniques are performed with said biopolymer array according to the invention being in physical contact with said electrode array.

In this preferred method according to the invention, the produced biopolymer array is in physical contact with e.g. an electrode array according to the present invention for the purpose of detecting binding reactions with electrochemical techniques. For this purpose, the porous membrane has to be arranged on the electrode array in such a way that each individual spot of the porous membrane is above an individual electrode of the electrode array. The electrochemical techniques possible within the scope of this invention comprise amperometric techniques, voltametric techniques and impedance spectroscopy.

Note that in case of e.g. a porous membrane that is divided in one or more subunits, the electrode array for analysis purposes is different to the electrode array used during the electrochemical production.

According to another preferred use of the biopolymer array according to the present invention, the bound biopolymers of the biopolymer array are cleaved from said biopolymer array prior to said analysis of samples containing biological molecules.

Since the biopolymers coupled to the porous membrane may be released after the electrochemical production of the biopolymer array, if cleavable linkers are used, it is possible to use the invention for the synthesis of small amounts of a plurality of different biopolymers at defined positions on said porous membrane and to cleave the biopolymers afterwards for further applications.

Therefore, it is e.g. possible to place the biopolymer array on a multiwell plate, whereas the plurality of spots on the porous membrane are aligned with the wells of said multiwell plate and to inject the synthesized biopolymers into said wells upon cleaving the biopolymer linkers in a controlled way.

According to a more preferred use of the biopolymer array according to the invention, the bound biopolymers of the biopolymer array are primer pairs and the analysis is a PCR amplification of a target molecule.

In this more preferred embodiment of the use according to the present invention, the porous membrane is used to synthesize a plurality of different primer pairs and to inject said primer pairs afterwards into the wells of a multiwell plate in order to perform a plurality of different PCR amplifications of target molecules in parallel.

In order to transfer the synthesized primer pairs from the porous membrane into the wells of a multiwell plate in a controlled manner, it is preferred to punch out the spots with synthesized primer pairs of the porous membrane and to transfer these parts into the wells of a multiwell plate prior to cleaving the biopolymer linkers.

Another aspect of the invention concerns a kit to perform a method according to the invention comprising an electrode array, a porous membrane, a device for applying electrical potentials and reagents.

The device for applying electrical potentials is e.g. a potentiometer. Preferably the potentiometer setup provides a 3-electrode configuration comprising a counter electrode and a reference electrode in order to enable a precise control of the applied potential. But also a 2-electrode setup with only a counter electrode is applicable. There are many different setups to apply an electrical potential to a plurality of electrodes that are known to someone skilled in the art. One distinguishing feature of these setups is the design of the counter electrode. Within the present invention it is possible to integrate the counter electrode into the chamber cover as well as to place it on the electrode array.

The reagents of the kit comprise the liquid reagents containing the monomeric, oligomeric or polymeric biopolymer building blocks, solutions to rinse the porous membrane in between two successive production cycles as well as the liquid solution necessary for the electrochemical deprotection step.

A preferred kit according to the invention additionally comprises a flow chamber and a liquid pump.

Since a multitude of production cycles have to be performed for the electrochemical production of the biopolymer arrays and said production cycles comprises in general at least one exchange of the reagents in physical contact with the porous membrane, it is preferred that the kit contains a flow chamber and a liquid pump, too. A flow chamber in the scope of this invention is a closed chamber with a liquid inlet and a liquid outlet that containes the electrode array as well as the porous membrane in such a way that the lateral position of electrode array and porous membrane is fixed. The liquid pump, e.g. a peristaltic pump, is used to exchange the reagents in the chamber in an efficient manner.

EXAMPLES

Example 1

Coupling of Two Different Fluorescent Dyes at Two Different Positions of the Porous Membrane Two different fluorescent dyes are coupled at two different positions of the substrate to generated two different fluorescent spots. In this example the coupling of a CY5 and a CY3 fluorescent dye is described. For this experiment, a selfmade reaction chamber comprising an electrode array with two gold electrodes, an inorganic porous membrane, standard DNA synthesis reagents, phosphoramidites of the fluorescent dyes and a buffer solution to electrochemically generate an acid media at the activated electrode is used.

The porous membrane is placed in proximity to the electrodes in the reaction chamber. Because the porous membrane itself has only binding sites without any protective groups, 5'-DMT-T-3'-phosphoramidites are coupled to the porous membrane as a starting group. For this purpose, the 5'-DMT-T-3'-phosphoramidites together with an activator are filled into the chamber to react with the functional groups of the membrane.

The solution is removed afterwards and an oxidation step is performed in order to oxidize the trivalent phosphor molecule from the first coupling step to the more stable pentavalent phosphor molecule. Then, the oxidation solution is rinsed out of the reaction chamber and the buffer solution is filled into the chamber. An electrical potential is applied to one of the electrodes in order to cleave the protecting groups on that part of the porous membrane being in proximity to the activated electrode. Afterwards, the buffer solution is rinsed out of the chamber again and a CY5-phosphoramidite with an activator is filled into the chamber to react at the deprotected binding site of the porous membrane. After a certain incubation time the phosphoramidite solution is rinsed out and another oxidation step is performed to stabilize the phosphor molecule. After the exchange of the oxidation solution with the buffer solution, an electrical potential is applied to the other electrode of the electrode array in oder to cleave the protecting groups from that part of the substrate being in proximity to this second electrode. In the next step, the CY3-phosphoramidite with an activator is filled into the chamber to react at the deprotected binding site of the porous membrane.

After a final oxidation step to transfer the trivalent phosphor molecule to a more stable pentavalent phosphor, the coupling of the two different fluorescent dyes to individual spots of the porous membrane is finished. To analyze the coupling procedure, the porous membrane is removed from the electrodes and analyzed with a fluorescence setup. The fluorescence pattern of the porous membrane exhibits two separated spots, one spot irradiating at the characteristic CY5-wavelength of 662 nm and the other irradiating at the characteristic CY3-wavelength of 563 nm.

Example 2

Synthesis of Two Different Oligonucleotides at Two Different Positions on a Membrane and Hybridization with Complementary Target Oligonucleotides Two different oligonucleotides are synthesized at two different positions of the substrate using the setup of example 1. In this example, the synthesis of a $(dA)_{15}$-mer (SEQ ID NO: 3) and a $(T)_{15}$-mer (SEQ ID NO: 4) oligonucleotide at two different positions of a porous membrane is described.

The porous membrane is placed in proximity to the electrodes in the reaction chamber. At the beginning, a T-phosphoramidite is coupled to the functional groups of the membrane and stabilized afterwards like explained in example 1. Next, an electrical potential is applied to the first electrode to cleave the protecting groups in proximity to the activated electrode. After the buffer solution is rinsed out of the chamber, the next 5'-DMT-T-3'-phosphoramidite with an activator is filled into the chamber to react with the deprotected binding sites of the 5'-DMT-T-3'-phosphoramidite coupled to the porous membrane and to elongate the chain at this position. This synthesis procedure is repeated until a $(T)_{15}$-mer (SEQ ID NO: 4) oligonucleotide is synthesized at the first electrode.

When the $(T)_{15}$-mer (SEQ ID NO: 4) oligonucleotide is finished, the synthesis of the $(dA)_{15}$-mer (SEQ ID NO: 3) oligonucleotide at the second electrode is started. The procedure is analogous to the synthesis of the $(T)_{15}$-mer (SEQ ID NO: 4) outlined before using A-phosphoramidites instead 5'-DMT-T-3'-phosphoramidites. Finally, two different oligonucleotides, an $(T)_{15}$-mer (SEQ ID NO: 4) and a $(dA)_{15}$-mer (SEQ ID NO: 3) oligonucleotide are attached to the membrane at two different positions.

The synthesis product on the porous membrane is analyzed by a hybridization experiment using fluorescent dye coupled to complementary oligonucleotides. First, a $(dA)_{15}$-mer (SEQ ID NO: 3) oligonucleotide labeled with an CY5-dye is hybridized to the membrane and the CY5-$(dA)_{15}$-mer (SEQ ID NO: 3) hybridize only to the spot of the porous membrane functionalized with the $(T)_{15}$-mer (SEQ ID NO: 4) as demonstrated by the fluorescent signal at this position. Second, a $(T)_{15}$-mer (SEQ ID NO: 4) oligonucleotide labeled with an CY3-dye is hybridized to the membrane. The CY3-$(T)_{15}$-mer (SEQ ID NO: 4) hybridize to the $(dA)_{15}$-mer (SEQ ID NO: 3) and give a fluorescent signal only at the position of the porous membrane, where the $(dA)_{15}$-mer (SEQ ID NO: 3) is attached.

Example 3

Coupling of Two Different Fluorescent Dyes at Two Different Positions of the Porous Membrane Two different fluorescent dyes (CY5 and a CY3) were coupled at two different positions of the substrate to generated two different fluorescent spots. For this experiment, a self-made reaction chamber (volume 400 µl, height 0.9 mm) comprising an electrode array with two gold electrodes, an inorganic porous membrane, standard DNA synthesis reagents (containing DMT-phosphoramidites from Roth and Proligo, activator DCI, and capping reagents from Proligo, acetonitrile from Promochem, oxidizing reagent from Applied Biosystems), phosphoramidites of the fluorescent dyes (from Amersham Biosciences) and an electrochemically active buffer solution to electrochemically generate an acid media at the activated electrode were used. The self-made reaction chamber was made out of PEEK material with the two gold electrodes (diameter of each electrodes is 1.8 mm arranged with a distance of 3 mm) integrated as anodes in the bottom. The chamber cover was made out of gold covered aluminium representing the cathode of the electrochemical setup and comprised two fluidic ports.

In this example a PolyAN PP membrane (from PolyAn GmbH, Berlin, Germany; material: polypropylene, thickness: 160 µm, pore size: 0.2 µm) with covalently bound hydroxyl-functionalities on the surface was placed in proximity to the electrodes in the reaction chamber. Because the porous membrane itself had only binding sites without any protective groups, 5'-DMT-T-3'-phosphoramidites were coupled to the porous membrane as a starting group. For this purpose, 0.5 ml of a 0.05 M solution of 5'-DMT-T-3'-phosphoramidite (Roth, Cat. No 2222,2, in Acetonitrile) together with 0.5 ml of the activator DCI (0.25 M, 4,5-Dicyanoimidazole in Acetonitrile, Proligo, Cat. No L380018) were filled into the chamber for 2 minutes to react with the functional groups of the membrane.

The solution is rinsed out afterwards followed by a washing step With 0.5 ml acetonitrile. Then an oxidation step with 2.0 ml of 0.02 M iodine solution in tetrahydrofurane (Applied Biosystems, Cat. No 401732, incubation time 1 min) was performed in order to oxidize the trivalent phosphor molecule from the first coupling step to the more stable pentavalent phosphor molecule.

Then, the oxidation solution was rinsed out of the reaction chamber and a capping reaction was performed for 2 minutes in the reaction chamber using commercially available capping solutions (mixture of 1.0 ml Tac-Anhydrid in Tetrahydrofurane; (Proligo, Cat. No L370018) and 1.0 ml 1-Methylimidazole in Tetrahydrofurane; (Roth, Cat. No 2256,2)). After releasing the mixture from the reaction chamber a washing step with two times 5.0 ml acetonitrile was done before the electrochemically active buffer solution was filled into the chamber. An electrical potential was applied to one of the electrodes in order to cleave the protecting groups on that part of the porous membrane being in proximity to the activated electrode. In this experiment the deblocking was performed with an electric current of −300 µA for 60 sec.

Afterwards, the electrochemically active buffer solution was rinsed out of the chamber again and a mixture of 0.3 ml of 0.05 M Cy5-phosphoramidite (Amersham Biosciences, Cat. No 27-1801-02) with 0.7 ml DCI as activator (0.25 M 4,5-Dicyanoimidazole in Acetonitrile, Proligo, Cat. No L380018) was filled into the chamber to react at the deprotected binding site of the porous membrane. After an incubation time of 2 minutes, the phosphoramidite solution was rinsed out and a washing step with two times 5.0 ml of acetonitrile and another oxidation step was performed to stabilize the phosphor molecule.

After removing the oxidation solution and a successive washing step with two times 5.0 ml acetonitrile, the chamber was filled again with the electrochemically active buffer solution and an electrical potential (again −300 µA for 60 sec) was applied to the second electrode of the electrode array in order to cleave the protecting groups from that part of the substrate being in proximity to this electrode. In the next step, a mixture of 0.3 ml of 0.05 M Cy3-phosphoramidite (Amersham Biosciences, Cat. No 27-1789-01) with 0.7 ml DCI as activator (0.25 M 4,5-Dicyanoimidazole in Acetonitrile, Proligo, Cat. No L380018) was filled into the chamber to react for 2 minutes at the deprotected binding site of the porous membrane.

Figure 1B:
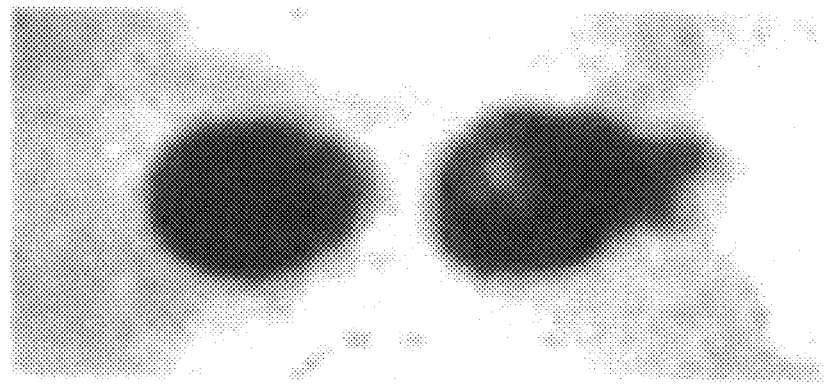

After another washing step with acetonitrile, an oxidation step to transfer the trivalent phosphor molecule to a more stable pentavalent phosphor and a final washing step with acetonitrile, the coupling of the two different fluorescent dyes to individual spots of the porous membrane was finished. To analyze the coupling procedure, the porous membrane was removed from the electrodes and analyzed with a commercial fluorescence setup (Lumi-Imager of Roche Diagnostics GmbH). The fluorescence pattern of the porous membrane exhibited two separated spots (see FIG. 1, diameter of the spots is around 3 to 4 mm) FIG. 1a was recorded in the 600 nm channel of the Lumi-Imager (500 msec) and only the CY5 spot with a characteristic wavelength of 662 nm is visible. FIG. 1b was recorded in the 520 nm channel of the Lumi-Imager (500 msec) and here both spots are visible. Because the characteristic wavelength of CY3 is 563 nm and due to the emission spectra of both fluorescence dyes both spots are visible in this channel.

Figure 2:
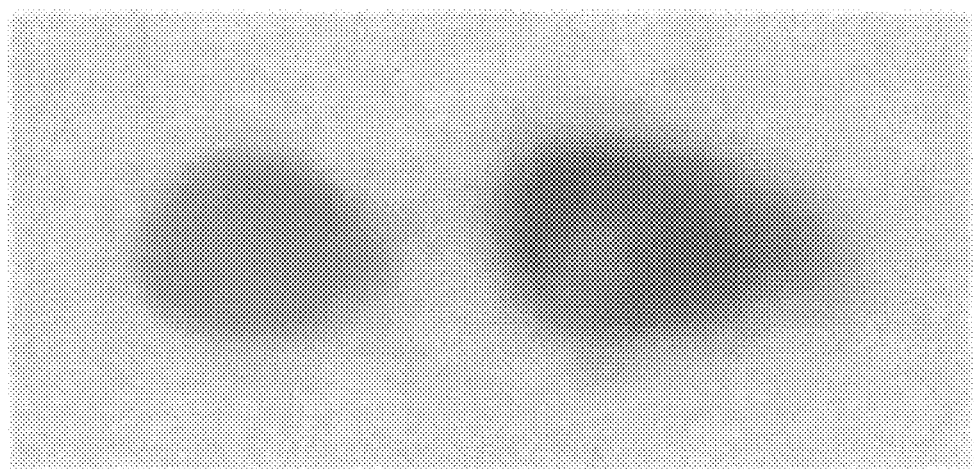
FIG. 2: Photograph of a porous membrane with 2 spots having different attached fluorescence dyes recorded with a commercial digital camera.

FIG. 2 shows a gray image of the membrane recorded with a standard digital camera and the different colors of the two spots are apparent.

Example 4

Synthesis of a Labeled Oligonucleotide on a Porous Membrane

In this example a oligonucleotide, a $(T)_5$-mer oligonucleotide, was synthesized at two different positions of the substrate using the setup of Example 3. A different synthesis was performed at each of said two positions with respect to the electrochemical parameters.

For this experiment a Medifab PET 07/15-9 membrane was used (from Sefar, Rueschlikon, Switzerland; material: polyethyleneterephthalat, thickness: 55 µm, pore size: 15 µm) with covalently bound hydroxyl-functionalities on the surface. As in Example 1, the membrane was placed in proximity to the electrodes in the reaction chamber. At the beginning, a 5'-DMT-T-3'-phosphoramidite was coupled to the functional groups of the membrane and stabilized afterwards like explained in Example 3.

Next, the chamber was filled with the electrochemically active buffer solution (see Example 3) and an electrical potential (−450 µA for 60 sec) was applied to the first electrode (corresponding to the left spot in FIG. 3) to cleave the protecting groups in proximity to the activated electrode. After the electrochemically active buffer solution was rinsed out of the chamber, the next 5'-DMT-T-3'-phosphoramidite with DCI as activator was filled into the chamber to react with the deprotected binding sites of the 5'-DMT-T-3'-phosphoramidite coupled to the porous membrane and to elongate the chain at this position. To complete the synthesis cycle the following steps were performed as explained in Example 3: a washing step with acetonitrile, an oxidation step, another washing step with acetonitrile, a capping step and a final washing step with acetonitrile. After the final washing step the first synthesis cycle of the desired oligonucleotide was complete. This synthesis procedure was repeated until a $(T)_4$-mer oligonucleotide is synthesized. For the final synthesis step a 5'-DMT-T-3'-phosphoramidite labeled with a CY5-dye was used in order to visualize the synthesis product afterwards.

Afterwards, the synthesis of the $(dT)_5$-mer oligonucleotide at the second electrode (corresponding to the right spot in FIG. 3) was started. The procedure is analogous to the synthesis of the first oligonucleotide outlined before, but on this electrode the reaction time of each electrochemical deprotecting step was reduced to only 30 sec.

Figure 3:
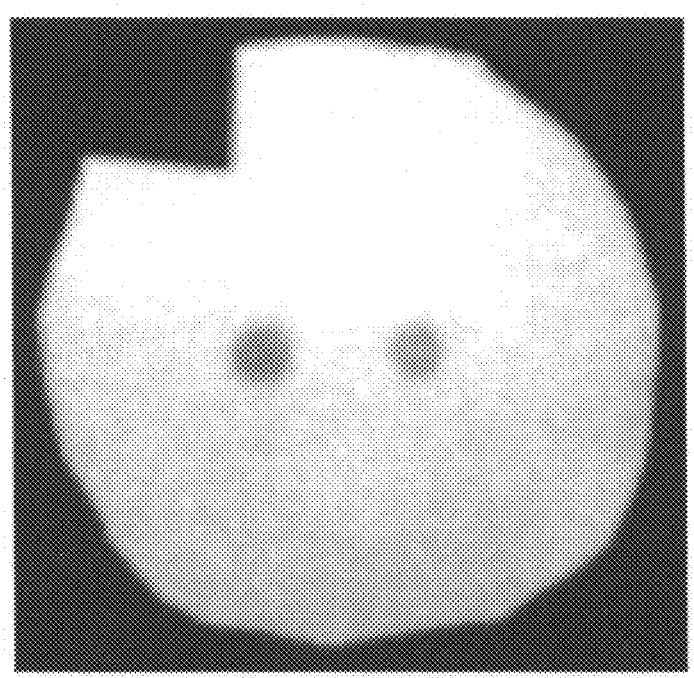
FIG. 3: Fluorescence images of a porous membrane with 2 spots having a Cy5-labelled oligonucleotide that is synthesized with different electrochemical parameters.

From FIG. 3 it is apparent that the fluorescence intensity of the left spot is higher than of the right spot. This may be an indication for a reduced yield of the deprotection step, when the reaction time is reduced from 60 sec to 30 sec resulting in a reduced amount of correctly synthesized oligonucleotides.

Example 5

Synthesis of a Oligonucleotide on a Porous Membrane and Hybridization with a Labeled Complementary Target In this example a 20-mer oligonucleotide (5'-GG ACA CGT ATC GCA CAC CCA-3', SEQ ID NO. 1) was synthesized on a porous membrane using the setup of Example 3. For this experiment again a Medifab PET 07/15-9 membrane was used (from Sefar, Rueschlikon, Switzerland; material: polyethyleneterephthalat, thickness: 55 µm, pore size: 15 µm). The synthesis was performed as outlined in Example 4 with a deprotection time of 60 sec and −300 µA. At the end of the synthesis the membrane was incubated in a falcon tube with 5.0 ml of a concentrated ammonia solution for 1 hour at room temperature to cleave off all protecting groups from the nucleobases and the phosphate residues to release an unprotected oligonucleotide bounded onto the surface.

The synthesis product on the porous membrane was analyzed by a hybridization experiment using a 1:1-mix of two complementary oligonucleotides with the same sequence, each coupled to a Cy5 fluorescent dye, one at the 5'-end and at the other at the 3'-end (5'-TGG GTG TGC GAT ACG TGT CC-3', SEQ ID NO. 2). At first, a pre-hybridization step in a buffer containing 3×SSPE, 0.05% TWEEN 20 (ICI Americas Inc.) was performed in a falcon tube for 10 min after washing two times with water. The hybridization step was performed with the complementary Cy5-labeled oligonucleotide mix strand mentioned before in the same buffer as used for the pre-hybridization step. The incubation was done at room temperature for 20 hours. Afterwards, a washing procedure was performed with the following steps: 5 min at room temperature with 3×SSPE, 0.05% TWEEN 20, 5 min at room temperature with 0.5×SSPE, 0.05% TWEEN 20, 5 min at room temperature with 0.5×SSPE. After the final washing step the detection was done at the Lumi-Imager in the 600 nm channel (500 msec) and on a fluorescence microscope in the 515-560 nm channel.

Figure 4:
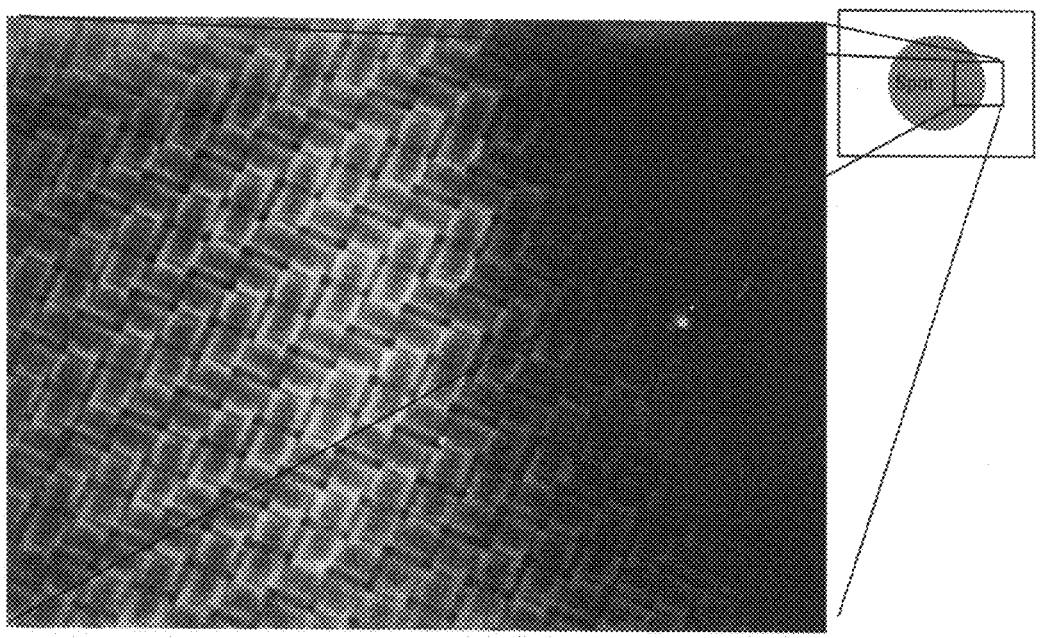
FIG. 4: Fluorescence images of a porous membrane with 1 spot having an oligonucleotide that is hybridized with the complementary, Cy5-labelled oligonucleotide.

FIG. 4 shows a strongly enlarged fluorescence microscope image of the membrane at the edge of the spot comprising the hybridized oligonucleotides. In this figure even the structure of the membrane is apparent. Since there is now fluorescence light detectable aside of the spot, the dye-labelled target only attached to those parts of the porous membrane with bound, synthesized oligonucleotides, even though the entire membrane was in contact with said dye-labelled target. After subsequent dehybridization and intensive rinsing, the complete porous membrane lack any fluorescence intensity again.

What is claimed is:

1. A method for the electrochemical production of a biopolymer array Comprising a porous membrane and bound biopolymers composed of monomeric, oligomeric or polymeric biopolymer building blocks, comprising the following steps:
   providing an electrode array comprising selectively addressable electrodes;
   providing a porous membrane comprising binding sites for biopolymer building blocks, the binding sites bearing protective groups that are electrochemically unstable;
   providing liquid reagents comprising monomeric, oligomeric or polymeric biopolymer building blocks, said biopolymer building blocks optionally comprise binding sites for bipolymer building blocks bearing protective groups that are electrochemically unstable,
   bringing said porous membrane into physical contact with said electrode array,
   performing at least one production cycle comprising:
   applying an electrical potential to at least one selected electrode of said electrode array, whereby an electrochemical reaction deprotects the protective groups of those binding sites that are arranged above said selected electrodes and that comprise electrochemically unstable protective groups being electrochemically unstable at said applied electrical potential, and
   bringing said porous membrane and said electrode array into physical contact with said liquid reagents, whereby said monomeric, oligomeric or polymeric biopolymer building blocks of said liquid reagents bind to the electrochemically deprotected binding sites, thereby producing the biopolymer array, and
   removing the produced biopolymer array comprising said porous membrane and bound biopolymers composed of monomeric, oligomeric or polymeric biopolymer building blocks from said electrode array.

2. The method according to claim 1, whereby in the production cycle performance step said monomeric, oligomeric or polymeric biopolymer building blocks of said liquid reagents bind to the electrochemically deprotected binding sites of said porous membrane in all production cycles.

3. The method according to claim 1, whereby in the production cycle performance step said monomeric, oligomeric or polymeric biopolymer building blocks of said liquid reagents bind to the electrochemically deprotected binding sites of said porous membrane and/or to the electrochemically deprotected binding sites of said monomeric, oligomeric or polymeric biopolymer building blocks bound to the porous membrane.

4. The method according to claim 1, whereas said porous membrane and said electrode array are in physical contact with a liquid solution, when the electrical potential is applied in the at least one production cycle of the production cycle performance step.

5. The method according to claim 1, whereas in two successive production cycles of the production cycle performance step a different group of electrodes is selected and/or a different electrical potential is applied and/or different liquid reagents are provided.

6. The method according to claim 1, wherein said protective groups are deprotected by electrochemical reagents generated at the electrode surface by the applied electrical potential.

7. The method according to claim 1, wherein said protective groups are cleaved by applying said electrical potential.

8. The method according to claim 1 further comprising additional steps of detecting a detectable label coupled to the protective groups of the biopolymer building blocks that are bound to the porous membrane.

9. The method according to claim 1, wherein said porous, membrane comprises a porous inorganic material.

10. The method according to claim 9, wherein said porous inorganic material is selected from the group consisting of a porous glass material, a porous silicon material and a porous polymer or copolymer material.

11. The method according to claim 1, wherein said porous membrane comprises a porous organic material.

12. The method according to claim 11, wherein said porous organic material is selected from the group consisting of a porous plastic material, Cellulose and nitrocellulose.

13. The method according to claim 1, wherein said biopolymer building blocks are nucleic acid building blocks.

14. The method according to claim 13, wherein the protective groups of said nucleic acid building blocks are acid labile protective groups or base labile protective groups.

15. The method according to claim 14, wherein said acid labile protective groups are selected from the group consisting of pixyl groups and trityl groups.

16. The method according to claim 15, wherein said acid labile protective groups are selected from the group consisting of 4,4'-dimethoxy triphenylmethyl and 4-monomethoxy triphenylmethyl.

17. The method according to claim 14, wherein said base labile protective groups are selected from the group consisting of levulinyl groups and silyl groups.

18. The method according to claim 17, wherein said base labile protective groups are selected from the group consisting of tert-butyldimethyl silyl and tert-butyldiphenyl silyl.

19. The method according to claim 1, wherein said biopolymer building blocks are peptide building blocks.

20. The method according to claim 19, wherein the protective groups of said peptide building blocks are base labile protective groups or acid labile protective groups.

21. The method according to claim 20, wherein said base labile protective groups are fluorenylmethoxycarbonyl.

22. The method according to claim 20, wherein said acid labile protective groups are tert-butyloxycarbonyl.

* * * * *

SEQUENCE LISTING

<160> NUMBER OF SEQ ID NOS: 4

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
ggacacgtat cgcacaccca                                              20

<210> SEQ ID NO 2
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
tgggtgtgcg atacgtgtcc                                              20

<210> SEQ ID NO 3
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
aaaaaaaaaa aaaaa                                                   15

<210> SEQ ID NO 4
<211> LENGTH: 15
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
tttttttttt ttttt                                                   15